United States Patent
Birkner

(10) Patent No.: US 12,158,170 B2
(45) Date of Patent: Dec. 3, 2024

(54) TOOL-FREE FRONT ATTACHMENT FITTING

(71) Applicant: Häfele Berlin GmbH & Co KG, Berlin (DE)

(72) Inventor: Robert Birkner, Berlin (DE)

(73) Assignee: Häfele Berlin GmbH & Co KG, Berlin (DE)

( * ) Notice: Subject to any disclaimer, the term of this patent is extended or adjusted under 35 U.S.C. 154(b) by 579 days.

(21) Appl. No.: 17/304,848

(22) Filed: Jun. 27, 2021

(65) Prior Publication Data

US 2022/0003265 A1 Jan. 6, 2022

(30) Foreign Application Priority Data

Jul. 2, 2020 (DE) .................. 20 2020 103 851.6

(51) Int. Cl.
*F16B 12/12* (2006.01)
*F16B 12/20* (2006.01)

(52) U.S. Cl.
CPC .... *F16B 12/2027* (2013.01); *F16B 2012/209* (2013.01)

(58) Field of Classification Search
CPC .. F16B 12/12; F16B 12/2009; F16B 12/2027; F16B 2012/103; F16B 2012/209; A47B 2230/0044; A47B 2230/0048
See application file for complete search history.

(56) References Cited

U.S. PATENT DOCUMENTS

| | | | | |
|---|---|---|---|---|
| 4,647,262 A * | 3/1987 | Yokota | ............... | F16B 21/02 24/453 |
| 5,577,297 A * | 11/1996 | Lautenschlager | ......... | E05D 5/08 16/388 |
| 5,586,364 A * | 12/1996 | Ferrari | ............... | F16B 21/02 411/46 |
| 5,711,054 A | 1/1998 | Salice | | |
| 5,979,017 A * | 11/1999 | Karl | ............... | E05D 5/08 16/382 |
| 6,234,596 B1 * | 5/2001 | Egger | ............... | A47B 88/95 312/348.4 |
| 6,257,796 B1 * | 7/2001 | Salice | ............... | F16B 12/2027 403/231 |

(Continued)

FOREIGN PATENT DOCUMENTS

DE 299 14 115 U1 10/1999
DE 299 22 942 U1 3/2000
(Continued)

*Primary Examiner* — Michael P Ferguson
(74) *Attorney, Agent, or Firm* — Orbit IP, LLP; Marc G. Martino

(57) ABSTRACT

A fitting part for tool-free fastening in a bore in a panel includes a radially outwardly expandable expansion sleeve for insertion into the bore and a fitting housing, which is mounted in the expansion sleeve so as to be rotatable about an axis of rotation between a starting rotary position and a final rotary position, has a lever arm which is arranged outside the expansion sleeve and has a latching device, and has an expansion contour which is arranged inside the expansion sleeve and, upon rotation of the fitting housing in the expansion direction of rotation from the starting rotary position to the final rotary position, expands the expansion sleeve radially outwards.

16 Claims, 3 Drawing Sheets

(56) References Cited

U.S. PATENT DOCUMENTS

| | | | | |
|---|---|---|---|---|
| 6,279,200 | B1* | 8/2001 | Ferrari | ............... E05D 7/125 |
| | | | | 16/382 |
| 6,361,241 | B1 | 3/2002 | Ferrari et al. | |
| 11,105,355 | B2* | 8/2021 | Dietrich | ............... F16B 12/24 |
| 2005/0196249 | A1* | 9/2005 | Huang | ............... E05D 5/0276 |
| | | | | 411/60.1 |

FOREIGN PATENT DOCUMENTS

| | | |
|---|---|---|
| DE | 20 2004 004 791 U1 | 6/2004 |
| EP | 0 755 640 A1 | 1/1997 |
| ES | 2 150 355 A1 | 11/2000 |
| FR | 2 782 113 A1 | 2/2000 |

\* cited by examiner

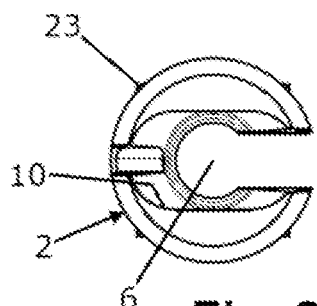
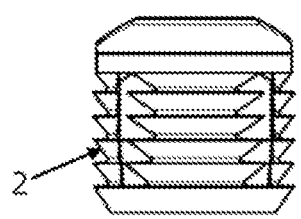
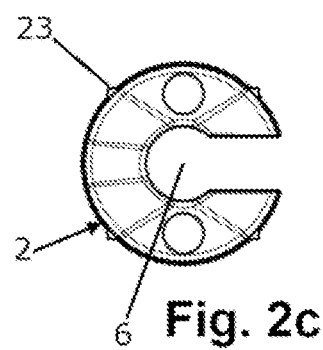
Fig. 2a  Fig. 2b  Fig. 2c
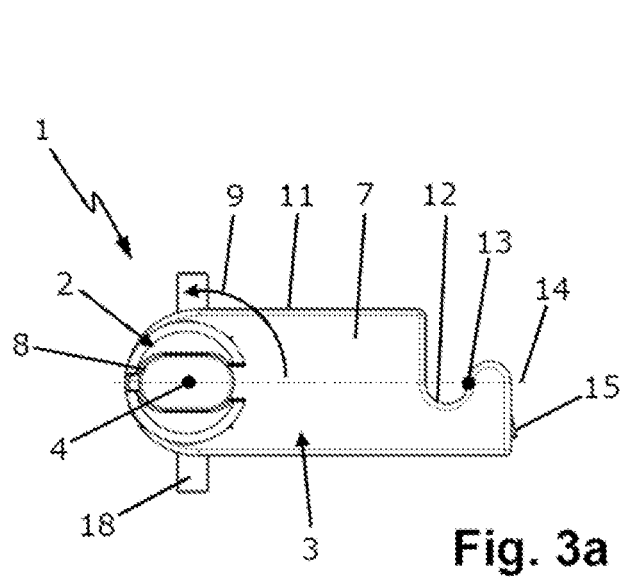
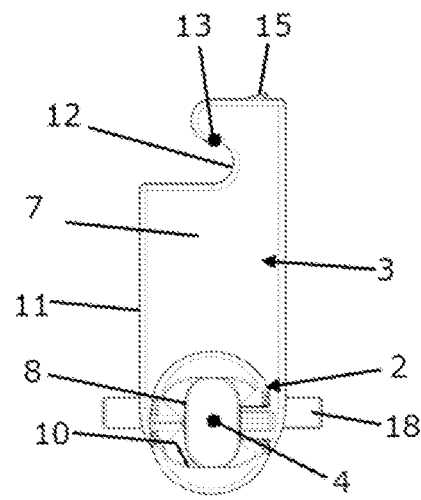
Fig. 3a  Fig. 3b
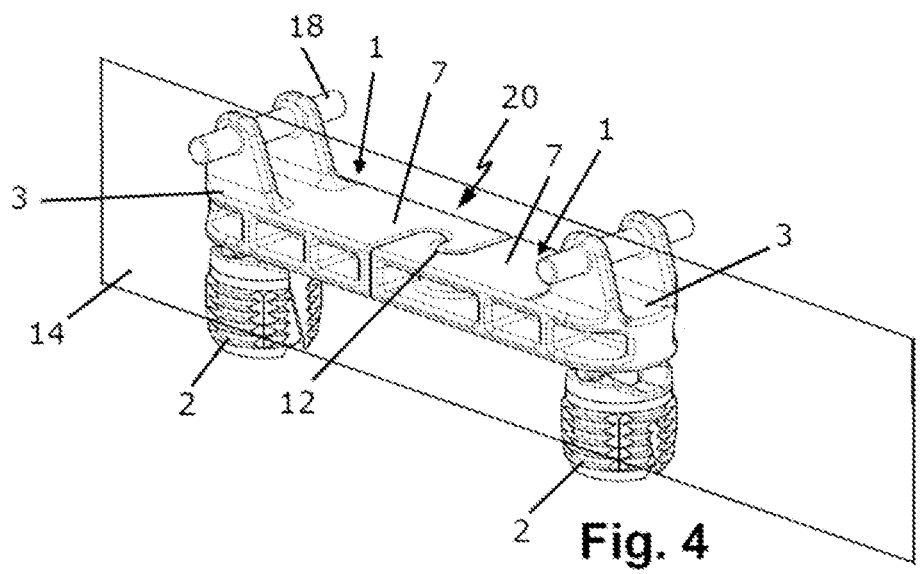
Fig. 4

TOOL-FREE FRONT ATTACHMENT FITTING

CROSS-REFERENCE TO RELATED APPLICATIONS

This application claims priority to German Utility Model Application No. 20 2020 103 851.6, filed Jul. 2, 2020, the entire contents of which are hereby incorporated in full by this reference.

DESCRIPTION

Field of the Invention

The invention relates to a fitting part for tool-free fastening in a bore in a panel, in particular a furniture panel, and to a front attachment (connection) fitting assembled from two such fitting parts.

Background of the Invention

Front attachment fittings are used to fasten a front panel to the rest of the furniture carcass, for example for fastening a flap to the furniture carcass, and are usually screwed to the front panel by means of screws.

By contrast, the invention is based on the object of specifying a fitting part, for example a front attachment fitting, which can be fastened to a panel, in particular a front panel, in a tool-free manner.

SUMMARY OF THE INVENTION

This object is achieved according to the invention by a fitting part for tool-free fastening in a bore in a panel, in particular a furniture panel, comprising a radially outwardly expandable expansion sleeve for insertion into the bore and a fitting housing, which is mounted in the expansion sleeve so as to be rotatable about an axis of rotation between a starting rotary position and a final rotary position, has a lever arm which is arranged outside the expansion sleeve and has a latching device, and has an expansion contour which is arranged inside the expansion sleeve and, upon rotation of the fitting housing in the expansion direction of rotation from the starting rotary position to the final rotary position, expands the expansion sleeve radially outwards.

The expansion contour can exhibit its maximum spacing from the axis of rotation at any desired angle to the axis of rotation, but it is preferred for the maximum spacing to extend in the direction of the lever arm or at right angles thereto.

Particularly preferably, the front side, in the expansion direction of rotation, of the lever arm has a set-back stepped or S-shaped side contour, as seen in the expansion direction of rotation, at the free end of the lever arm, said side contour being point symmetric with respect to an axis of symmetry that extends parallel to the axis of rotation and lies in a radial plane, extending parallel to the lever arm, of the axis of rotation. The set-back side contour forms a rotation stop in the expansion direction of rotation.

Preferably, the latching device has a latching protrusion and a latching recess which are arranged on two end faces, remote from the axis of rotation, of the lever arm in a point symmetric manner with respect to an axis of symmetry that extends parallel to the axis of rotation and lies in a radial plane, extending parallel to the lever arm, of the axis of rotation.

The invention also relates to a fitting, for example a front attachment fitting, which is formed from two, preferably identical fitting parts configured as above. When the two fitting parts are arranged in a manner rotated through 180° with respect to one another, the lever arms are oriented along a line. Moreover, the free ends of the two lever arms bear against one another at their end faces, wherein the latching devices of the two fitting parts cooperate with one another.

The invention also relates to an arrangement comprising a panel, in particular a furniture panel, with two bores and comprising a fitting (for example a front attachment fitting) configured as above, wherein the one fitting part is inserted by way of its expansion sleeve into the one bore and the other fitting part is inserted by way of its expansion sleeve into the other bore, each fitting part being rotated into the final rotary position, wherein, in the final rotary positions of the two fitting parts, the two fitting parts are arranged in a manner rotated through 180° with respect to one another, their lever arms are oriented along a line, the free ends of the two lever arms bear against one another at their end faces, and the latching devices of the two fitting parts cooperate with one another.

For a front attachment, two bores at a predetermined spacing are required in a panel. The expansion sleeves of two fitting parts are plugged into these bores with a 180° offset. As a result of the fitting housing being rotated through 90° with respect to the expansion sleeve into the final rotary position, the expansion sleeves are firmly anchored in the bores. In the final rotary positions, the two fitting housings bear against one another preferably in each case in the expansion direction of rotation, in order in this way to mutually secure the two fitting housings against being overtwisted. Preferably, the lever arms engage, in particular in an S shape, in one another and are latched together.

Further advantages of the invention will become apparent from the description, the claims and the drawing. Similarly, the features mentioned above and those presented below can be used individually or together in any desired combination. The embodiments shown and described should not be understood as being an exhaustive enumeration, but rather are of an illustrative nature for outlining the invention.

BRIEF DESCRIPTION OF THE DRAWINGS

In the drawings:

FIGS. 2a, 2b, 2c show a detail view of an expansion sleeve, shown in FIG. 1, of the fitting part according to the invention in a side view (FIG. 2a and FIG. 2c) and in a plan view (FIG. 2b);

FIGS. 3a, 3b show the fitting part according to the invention in a non-expanded starting rotary position (FIG. 3a) and an expanded final rotary position (FIG. 3b);

FIG. 4 shows a front attachment fitting according to the invention that is made up of two fitting parts according to the invention, engaging in one another, in a perspective view.

DETAILED DESCRIPTION OF THE PREFERRED EMBODIMENTS

Figure 1A:
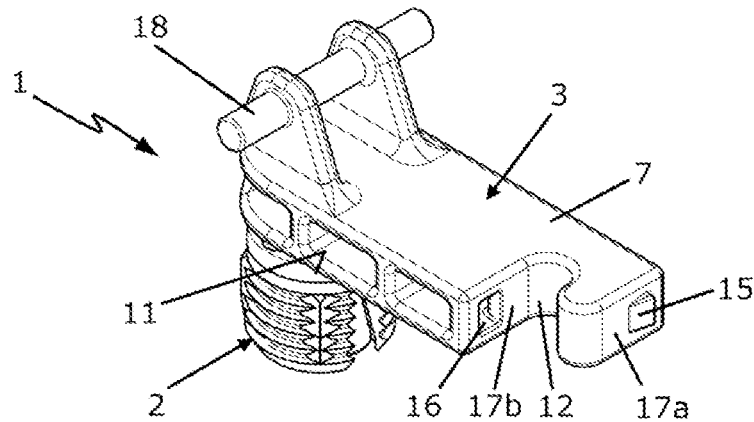
FIGS. 1a-1c show the fitting part according to the invention in a perspective view (FIG. 1a), in a longitudinal section (FIG. 1b) and in an exploded illustration (FIG. 1c)
Figure 1B:
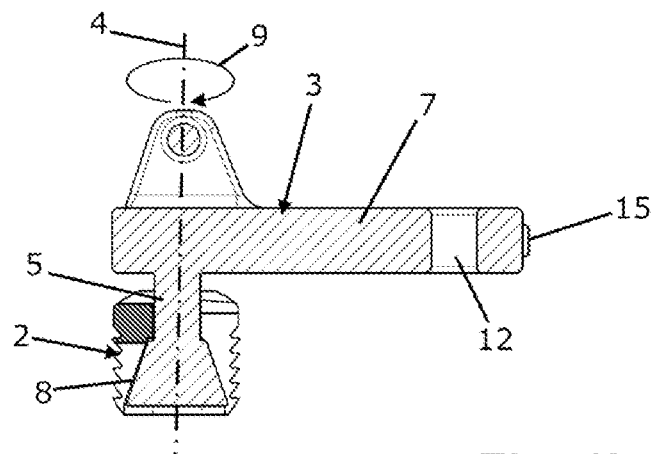
Figure 1C:
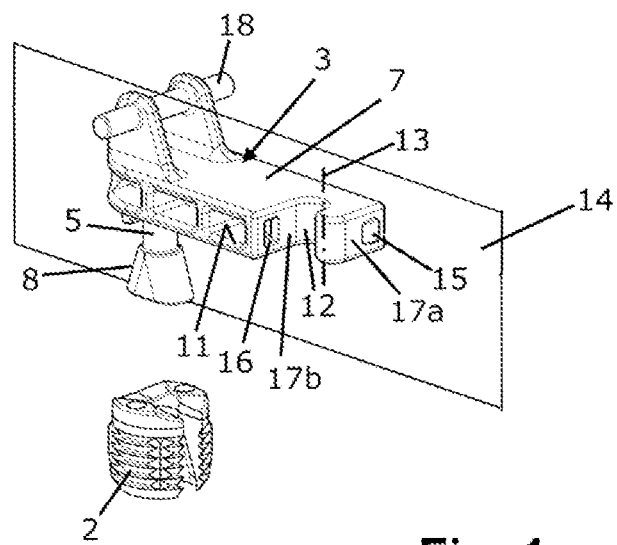

The fitting part 1 shown in FIGS. 1 to 3 serves for fastening in a tool-free manner in a bore in a furniture panel.

In the following text, the fitting 1 is described merely by way of the example of a front attachment fitting.

The fitting part 1 has a radially outwardly expandable expansion sleeve 2 to be inserted into the bore and a fitting housing 3, which is mounted in the expansion sleeve 2 so as to be rotatable about an axis of rotation 4 between a starting rotary position (FIG. 3*a*) and a final rotary position (FIG. 3*b*). To this end, a shank 5 of the fitting housing 3 is mounted in a bearing opening 6 of the expansion sleeve 2 so as to be rotatable about the axis of rotation 4. The expansion sleeve 2 can, as shown in the exemplary embodiment, be a slotted sleeve, which is clip-fastened to the shank 5, or alternatively have a radially outwardly expandable circumferential wall portion. Preferably, the expansion sleeve 2 is made of plastic and the fitting housing 3 of metal (for example zinc die-casting).

The fitting housing 3 has a lever arm 7, arranged outside the expansion sleeve 2, which extends at right angles to the axis of rotation 4, and an expansion contour 8, arranged within the expansion sleeve 2, which—upon rotation of the fitting housing 3 through 90° in the expansion direction of rotation 9 from the starting rotary position into the final rotary position—expands the expansion sleeve 2 radially outwardly. The expansion contour 8 can have an external contour that is eccentric with respect to the axis of rotation 4 or, as shown in the exemplary embodiment, is oval. The spacing of the expansion contour 8 from the axis of rotation 4 increases counter to the expansion direction of rotation 9, in order for the expansion sleeve 2 to be expanded radially outwardly by the fitting housing 3 being rotated through 90° in the expansion direction of rotation 9. The expansion contour 8 has its maximum spacing from the axis of rotation 4 preferably in the direction of the lever arm 7. The inner wall of the expansion sleeve 2 has preferably an internal contour 10 that corresponds to the expansion contour 8, in this case an oval one, and bears against the expansion contour 8 all the way around in the starting rotary position.

The front side 11, in the expansion direction of rotation 9, of the lever arm 7 has, at the free end of the lever arm 7, a set-back side contour 12, as seen in the expansion direction of rotation 9, which is point symmetric with respect to an axis of symmetry 13 that is parallel to the axis of rotation 4 and lies in a radial plane 14, extending parallel to the lever arm 7, of the axis of rotation 4. The set-back side contour 12 is formed preferably in an S-shaped manner, as shown in the exemplary embodiment, or in a stepped manner, but can alternatively also extend in a parallel or oblique manner with respect to the radial plane 14. The lever arm 7 furthermore has a latching device in the form of a latching protrusion 15 and a latching recess 16, which are arranged in a point symmetric manner with respect to the axis of symmetry 13 on two end faces 17*a*, 17*b*, remote from the axis of rotation 4, of the lever arm 7. The fitting housing 3 also carries an attachment element, in this case in the form of a transverse rod 18, which is oriented transversely to the radial plane 14.

FIG. 4 shows a front attachment fitting 20, which is formed from two identical fitting parts 1 engaging in one another. The two fitting parts 1 are arranged in a manner rotated through 180° with respect to one another, such that the radial planes 14 of the two fitting parts 1 form a common plane. The free ends of the two lever arms 7 bear against one another at the end faces, wherein the S-shaped side contours 12 of the two fitting parts 1 engage mutually in one another and wherein the latching protrusion 15 of the one fitting part 1 engages in the latching recess 16 of the other fitting part 1.

Figure 5A:
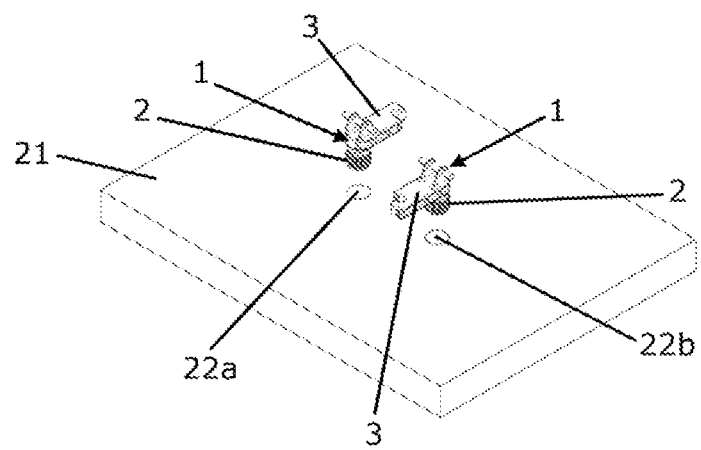
FIGS. 5a-5c show the mounting of the front attachment fitting according to the invention that is shown in FIG. 4 on a furniture panel.
Figure 5B:
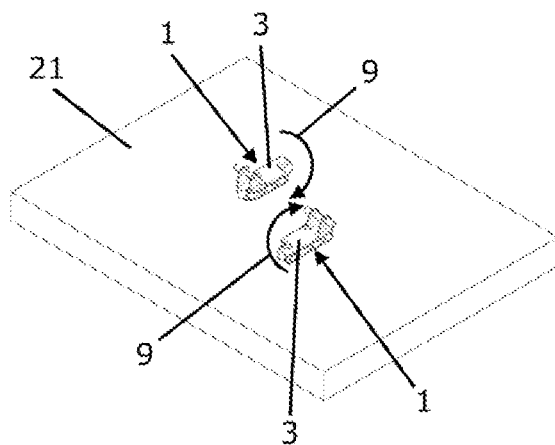
Figure 5C:
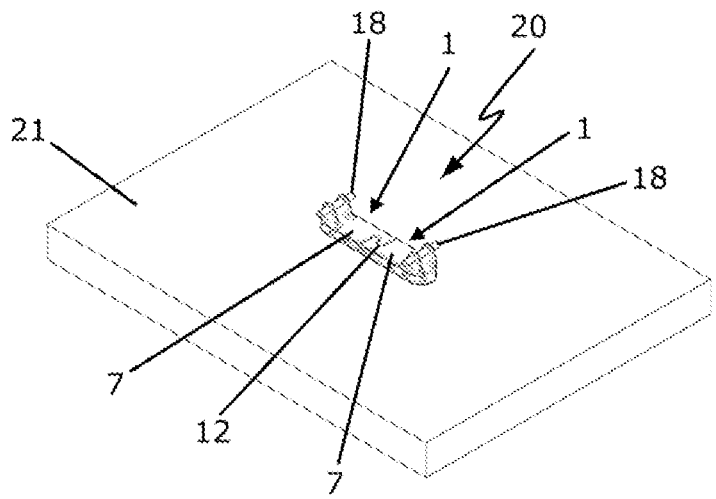

FIGS. 5*a*-5*c* show the mounting of the front attachment fitting 20 on a furniture panel, for example on a front panel 21. Two bores 22*a*, 22*b* (for example ∅10 mm, 11 mm deep) with a spacing of, for example, 46 mm are drilled into the front panel 21. With a 180° offset from one another, the one fitting part 1 is pressed by way of its expansion sleeve 2 into the one bore 22*a* and the other fitting part 1 is pressed by way of its expansion sleeve 2 into the other bore 22*b* in a tool-free manner (FIG. 5*a*), with the result that the expansion sleeves 2 are anchored in a rotationally fixed manner in the bores 22*a*, 22*b*. As shown in FIGS. 2*a*, 2*c*, the expansion sleeve 2 has, on its outer circumference, a plurality of radially outwardly protruding, pointed protrusions 23, which press into the bore wall and as a result keep the expansion sleeve 2 in a rotationally fixed manner in the bore. Subsequently, the user rotates the fitting housings 3 of the two fitting parts 1 in a tool-free manner within the expansion sleeves 2, in each case through 90° in the expansion direction of rotation 9, into the final rotary position (FIG. 5*b*). As a result, the expansion sleeves 2 are expanded in each case radially outwardly by the expansion contours 8 of the fitting parts 1 and are anchored in the bores 22*a*, 22*b*. The S-shaped side contours 12 of the two fitting parts 1 engage mutually in one another and in this way mutually secure the two fitting housings 3 against overtwisting (FIG. 5*c*). The latching protrusion 15 of the one fitting part 1 engages in the latching recess 16 of the other fitting part 1, with the result that the two fitting parts 1 are latched together in their final rotary positions. By means of the transverse rods 18 that are offset in a manner parallel to one another, the front attachment fitting 20 together with the front panel 21 can then be fastened to a carcass fitting (not shown).

What is claimed is:

1. A fitting comprising two identical fitting parts for tool-free fastening in a-bores in a panel, each fitting part comprising:
    a radially outwardly expandable expansion sleeve for insertion into the bore; and
    a fitting housing mounted in the expansion sleeve configured to be rotatable about an axis of rotation between a starting rotary position and a final rotary position;
    the fitting housing having a lever arm transversely extending therefrom which is arranged outside the expansion sleeve and has a latching device disposed at a distal end of the lever arm;
    the fitting housing having an expansion contour which is arranged inside the expansion sleeve;
    an attachment element fixedly attached directly to and extending from a proximal end of the lever arm, wherein the fitting housing and the attachment element are arranged opposite to each other with respect to the lever arm, and wherein the attachment element comprises a rod or physical structure configured for attaching to a further element; and
    wherein upon rotation of the fitting housing about the axis of rotation in an expansion direction of rotation from the starting rotary position to the final rotary position, the expansion sleeve is configured to expand radially outwards;
    wherein, when the two fitting parts are arranged in a manner rotated through 180° with respect to one another, their lever arms are oriented along a line, the free ends of the two lever arms bear against one another at their end faces, and the latching devices of the two fitting parts matingly engage with one another.

2. The fitting according to claim 1, wherein the expansion contour is embodied as an external contour that is eccentric or oval with respect to the axis of rotation.

3. The fitting according to claim 1, wherein the expansion contour exhibits its maximum spacing from the axis of rotation in the direction of the lever arm or at right angles thereto.

4. The fitting according to claim 1, wherein a front side, in the expansion direction of rotation, of the lever arm has a set-back side contour, as seen in the expansion direction of rotation, at a free end of the lever arm.

5. The fitting according to claim 4, wherein the set-back side contour is point symmetric with respect to an axis of symmetry that extends parallel to the axis of rotation and lies in a radial plane of the axis of rotation.

6. The fitting according to claim 4, wherein the set-back side contour is configured in a parallel or oblique manner with respect to the radial plane of the axis of rotation or in a stepped or S-shaped manner.

7. The fitting according to claim 1, wherein the latching device has a latching protrusion and a latching recess.

8. The fitting according to claim 7, wherein the latching protrusion and the latching recess are arranged on two end faces, remote from the axis of rotation, of the lever arm in a point symmetric manner with respect to an axis of symmetry that extends parallel to the axis of rotation and lies in a radial plane, extending parallel to the lever arm, of the axis of rotation.

9. The fitting according to claim 1, wherein the fitting housing has a shank which is mounted in a bearing opening of the expansion sleeve so as to be rotatable about the axis of rotation.

10. The fitting according to claim 1, wherein the expansion sleeve is slotted and clip-fastened onto a shank of the fitting housing.

11. The fitting according to claim 1, wherein the attachment element is in the form of the rod which extends at right angles to the lever arm.

12. An arrangement comprising a panel with two bores and comprising the fitting according to claim 1, wherein one fitting part is inserted by way of its expansion sleeve into the one bore and the other fitting part is inserted by way of its expansion sleeve into the other bore, each fitting part being rotated into the final rotary position, and wherein, in the final rotary positions of the two fitting parts, the two fitting parts are arranged in a manner rotated through 180° with respect to one another, their lever arms are oriented along a line, the free ends of the two lever arms bear against one another at their end faces, and the latching devices of the two fitting parts cooperate with one another.

13. A fitting comprising two separate fitting parts, which cooperate with each other in a mounted state, for tool-free fastening in a respective bore in a panel, the fitting parts each comprising:

a radially outwardly expandable expansion sleeve for insertion into the bore;

a fitting housing mounted in the expansion sleeve so as to be rotatable about an axis of rotation between a starting rotary position and a final rotary position;

the fitting housing having a lever arm transversely extending therefrom which is arranged outside the expansion sleeve and has a latching device disposed at a distal end of the lever arm;

the fitting housing having an expansion contour which is arranged inside the expansion sleeve;

wherein upon rotation of the fitting housing about the axis of rotation in an expansion direction of rotation from the starting rotary position to the final rotary position, the expansion sleeve expands radially outwards;

wherein, when the two separate fitting parts are arranged in a manner rotated through 180° with respect to one another, their lever arms are oriented along a line, the free ends of the two lever arms bear against one another at their end faces, and the latching devices of the two fitting parts cooperate with one another;

wherein the two fitting parts are identical;

wherein one fitting part is inserted by way of its expansion sleeve into the one bore and the other fitting part is inserted by way of its expansion sleeve into the other bore, each fitting part being rotated into the final rotary position, and wherein, in the final rotary positions of the two fitting parts, the two fitting parts are arranged in a manner rotated through 180° with respect to one another, their lever arms are oriented along a line, the free ends of the two lever arms bear against one another at their end faces, and the latching devices of the two fitting parts cooperate with one another; and wherein each of the latching devices has a latching protrusion and a latching recess, and the latching protrusion of the one latching device is configured to engage in the latching recess of the other latching device and vice versa.

14. The arrangement according to claim 13, wherein a front side, in the expansion direction of rotation, of the lever arm has a set-back side contour, as seen in the expansion direction of rotation, at a free end of the lever arm.

15. The arrangement according to claim 14, wherein the set-back side contour is point symmetric with respect to an axis of symmetry that extends parallel to the axis of rotation and lies in a radial plane of the axis of rotation.

16. The arrangement according to claim 13, wherein the latching protrusion and the latching recess are arranged on two end faces, remote from the axis of rotation, of the lever arm in a point symmetric manner with respect to an axis of symmetry that extends parallel to the axis of rotation and lies in a radial plane, extending parallel to the lever arm, of the axis of rotation.

* * * * *

UNITED STATES PATENT AND TRADEMARK OFFICE
CERTIFICATE OF CORRECTION

PATENT NO. : 12,158,170 B2  
APPLICATION NO. : 17/304848  
DATED : December 3, 2024  
INVENTOR(S) : Robert Birkner Page 1 of 1

It is certified that error appears in the above-identified patent and that said Letters Patent is hereby corrected as shown below:

In the Claims

Column 4, Claim 1, Line 37, "a-bores" should read --bores--.

Signed and Sealed this  
Eleventh Day of March, 2025

Coke Morgan Stewart  
*Acting Director of the United States Patent and Trademark Office*